United States Patent
Chen et al.

(10) Patent No.: US 10,855,187 B1
(45) Date of Patent: Dec. 1, 2020

(54) DYNAMIC DISCHARGE CURRENT CONTROL FOR IMPROVING POWER SUPPLY OUTPUT REGULATION

(71) Applicant: DIALOG SEMICONDUCTOR INC., Campbell, CA (US)

(72) Inventors: Yimin Chen, Campbell, CA (US); Mengfei Liu, Campbell, CA (US); Jianming Yao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/563,770

(22) Filed: Sep. 6, 2019

(51) Int. Cl.
 *H02M 3/335* (2006.01)
 *H02M 1/00* (2006.01)
(52) U.S. Cl.
 CPC .......... *H02M 3/33507* (2013.01); *H02M 2001/0009* (2013.01)

(58) Field of Classification Search
 CPC ..... H02M 3/33507; H02M 2007/4815; H02M 2001/0009; H02M 3/22; H02M 1/08
 See application file for complete search history.

(56) References Cited

U.S. PATENT DOCUMENTS

2016/0218628 A1 7/2016 Yao et al.
2018/0062530 A1* 3/2018 Kong ............... H02M 1/08

* cited by examiner

*Primary Examiner* — Adolf D Berhane
*Assistant Examiner* — Afework S Demisse
(74) *Attorney, Agent, or Firm* — Haynes and Boone, LLP

(57) ABSTRACT

A flyback converter controller is provided with secondary-side controller that adjusts a discharge current form an output voltage rail during a communication period with a primary-side controller to maintain the output voltage within regulation.

18 Claims, 5 Drawing Sheets

US 10,855,187 B1

DYNAMIC DISCHARGE CURRENT CONTROL FOR IMPROVING POWER SUPPLY OUTPUT REGULATION

TECHNICAL FIELD

This application relates to switching power converter controllers, and more particularly to a dynamic discharge current control for improvising power supply output regulation in a flyback converter.

BACKGROUND

It is conventional to charge a mobile device such as a smartphone through a data interface such as a USB cable that is subject to a maximum current limit. At a default charging voltage such as 5V, the current limit leads to extended charging times. To decrease the charging time despite the current limits of USB cables, certain fast charging protocols have been developed in which the output voltage driven from the switching power converter through the data interface is elevated from a default level (for example, from 5V to 9V or 12V etc.) to deliver higher power without increasing the current above the charging cable limits. At these elevated charging voltages, the charging time is decreased despite the limited amount of current that can be conducted through the data interface.

In a flyback converter implementing a fast charge protocol, a transformer galvanically separates a primary side and a secondary side. It is the secondary side that drives the data interface to charge the mobile device. It is thus a secondary-side controller that enumerates the mobile device and determines whether an elevated power supply voltage is supported. To maintain the galvanic isolation, the secondary-side controller cannot simply communicate the resulting information to a primary-side controller for the flyback converter over a wire or lead. Instead, it is conventional for the secondary-side controller to transmit a message through a ground-isolating channel to the primary-side controller. The message informs the primary-side controller of the elevated power supply voltage. For example, it is conventional for the secondary-side controller to transmit the message through pulses transmitted through an optoisolator. The primary-side controller acknowledges the received pulses by pulsing a primary-side power switch transistor. The pulsing of the primary-side power switch transistor causes the power supply voltage to undesirably rise above the desired value for the power supply voltage, particularly during light load conditions.

Accordingly, there is a need in the art for improved regulation of the power supply voltage during primary-side-to-secondary-side communication as implemented by pulsing of the power switch transistor.

SUMMARY

In accordance with a first aspect of the disclosure, a flyback converter is provided that includes: a current source configured to conduct a discharge current from an output voltage rail for the flyback converter responsive to a discharge command; and a secondary-side controller configured to enumerate a mobile device regarding whether the mobile device supports a fast charge mode and configured to transmit a message to a primary-side controller during a communication period confirming that the fast charge mode is supported by the mobile device, the secondary-side controller including: a discharge control logic circuit configured to adjust the discharge command responsive to a deviation of a power supply voltage from a desired value of the power supply voltage during the communication period.

In accordance with a second aspect of the disclosure, a communication method during a communication period for a flyback converter is provided that includes: transmitting a message as a series of pulses from a secondary-side controller to a primary-side controller; in the primary-side controller, acknowledging the series of pulses by cycling a power switch through a series of cycles; measuring a deviation of a power supply voltage from a desired value responsive to the cycling of the power switch through the series of cycles; and adjusting a discharge current to ground from an output voltage rail supplying the power supply voltage to maintain the power supply voltage within a regulation range that includes the desired value.

In accordance with a third aspect of the disclosure, a flyback converter is provided that includes: a plurality of selectable resistor circuits coupled between an output voltage rail for the flyback converter, each selectable resistor circuit comprising a resistor in series with a switch; and a secondary-side controller configured to enumerate a mobile device regarding whether the mobile device supports a fast charge mode and configured to transmit a message to a primary-side controller during a communication period confirming that the fast charge mode is supported by the mobile device, the secondary side controller including: a discharge control logic circuit configured to select from the plurality of selectable resistor circuits responsive to a deviation of a power supply voltage from a desired value of the power supply voltage during the communication period to adjust a discharge current conducted from the output voltage rail to ground.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
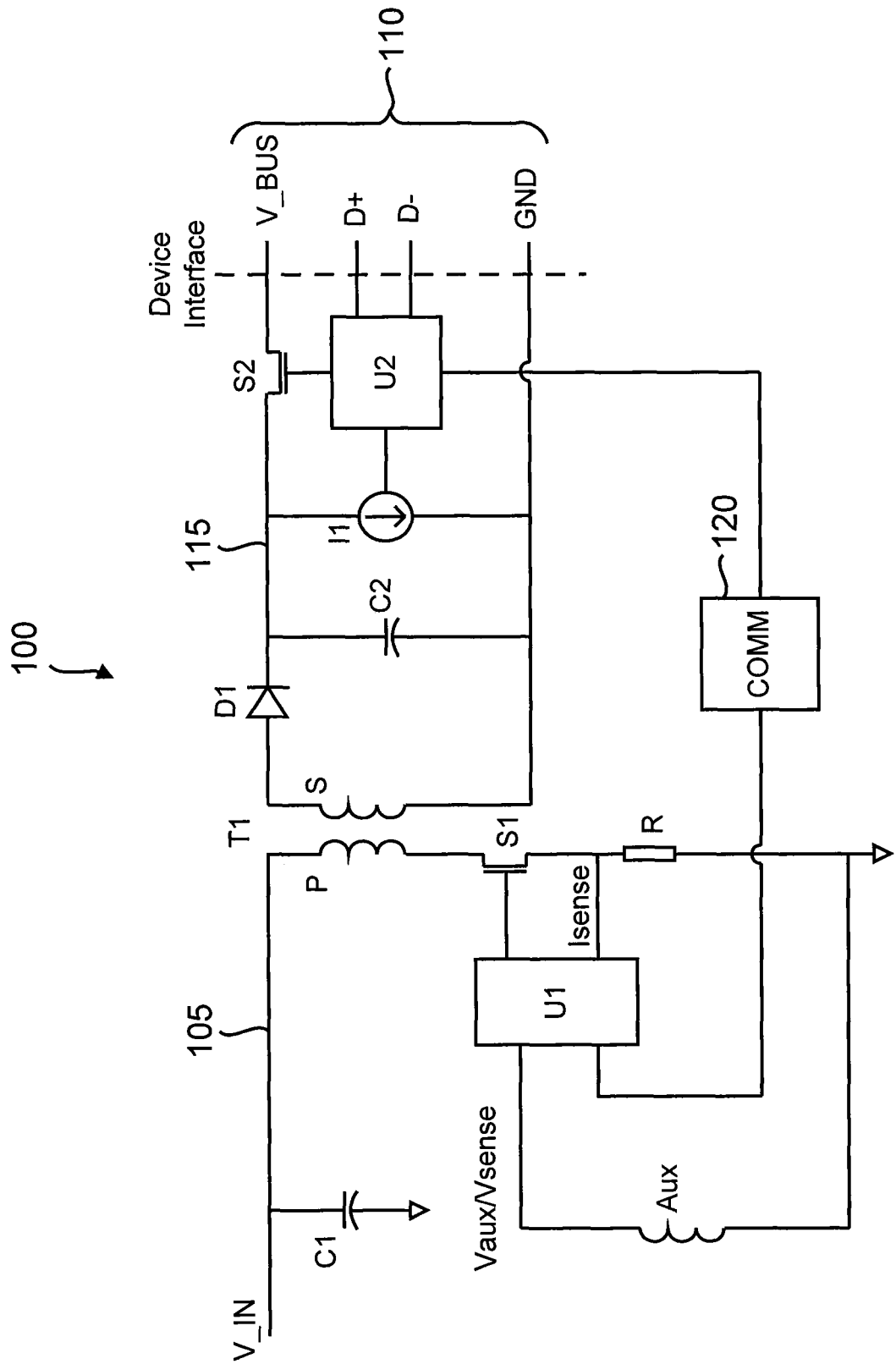
FIG. 1 illustrates a flyback converter in which a current source is dynamically controlled to minimize the disturbance of the power supply voltage during primary-side-to-secondary-side communication in accordance with an aspect of the disclosure.

An example flyback converter 100 that reduces disturbance of the power supply voltage during primary-side-tosecondary-side communication is illustrated in FIG. 1. A diode bridge (not illustrated) rectifies an AC mains voltage into a rectified input voltage V_IN carried on an input voltage rail 105. An input capacitor C1 coupled between the input voltage rail and ground functions to smooth the input voltage. A transformer T1 includes a primary winding P coupled between the input voltage rail and a power switch transistor S1. A primary-side controller U1 controls the cycling of the power switch transistor to regulate a power supply voltage carried on a voltage bus V_BUS on a USB cable 110.

In an embodiment with primary-side control, it is the primary-side controller U1 that regulates the power supply voltage. For example, the primary-side controller U1 can sense a Vsense voltage on an auxiliary winding Aux at the transformer reset time in each cycle of the power switch transistor S1 to sense the power supply voltage. Based upon this sensing, the primary-side controller U1 can then calculate a peak primary current for the next cycle of the power switch transistor S1. When the power switch transistor S1 is on, the primary current flows through the primary winding P and though the power switch transistor S1 to build up a sense resistor voltage Isense across a sense resistor R that couples between the power switch transistor S1 and ground. When the desired peak current has been reached as determined through Isense, the primary-side controller U1 switches off the power switch transistor S1.

However, it will be appreciated that in alternative embodiments, it is a secondary-side controller U2 that controls the cycling of the power switch transistor S1 as implemented through the primary-side controller U1. Regardless of how the power switch transistor cycling is controlled, it is the secondary-side controller U2 that enumerates a mobile device (not illustrated) through the data channels such as D+ and D− in the USB cable 110. It will be appreciated that the USB cable 110 may be replaced by other types of data cables such as the Lightning cable in alternative embodiments. After enumerating the mobile device regarding whether an elevated power supply voltage is supported, the secondary-side controller U2 alerts the primary-side controller U1 of the new power supply voltage level through an optoisolator (COMM) 120. In alternative embodiments, other types of ground-isolating communication channels may replace the optoisolator 120 such as a capacitor or a signaling transformer.

The resulting secondary-side-to-primary-side message transmitted through the optoisolator 120 comprises a series of pulses. The primary-side controller U1 acknowledges receipt of the pulses by cycling the power switch transistor S1. Just like a power cycle, such a communication cycle of the power switch transistor S1 results in magnetic energy being stored in the transformer T while the power switch transistor S1 is on. During this on-time for the power switch transistor S1, an output diode D1 connected to a secondary winding S for the transformer T prevents a secondary current from flowing in the secondary winding S. In alternative embodiments, the output diode D1 may be replaced by a synchronous rectifier switch transistor.

Once the power switch transistor is cycled off, the stored magnetic energy in the transformer T forward biases the output diode D1 so that a secondary winding current flows through the output diode D1 to charge an output capacitor C2 coupled between ground and an output voltage rail 115 with the power supply voltage. The primary-side-to-secondary-side communication that occurs through the communication cycles of the power switch transistor S2 thus increases the power supply voltage. During normal operation, the secondary-side controller U2 keeps an output switch transistor S2 on so that the output voltage rail 115 is connected to the V_BUS rail in the USB cable 110.

Figure 2:
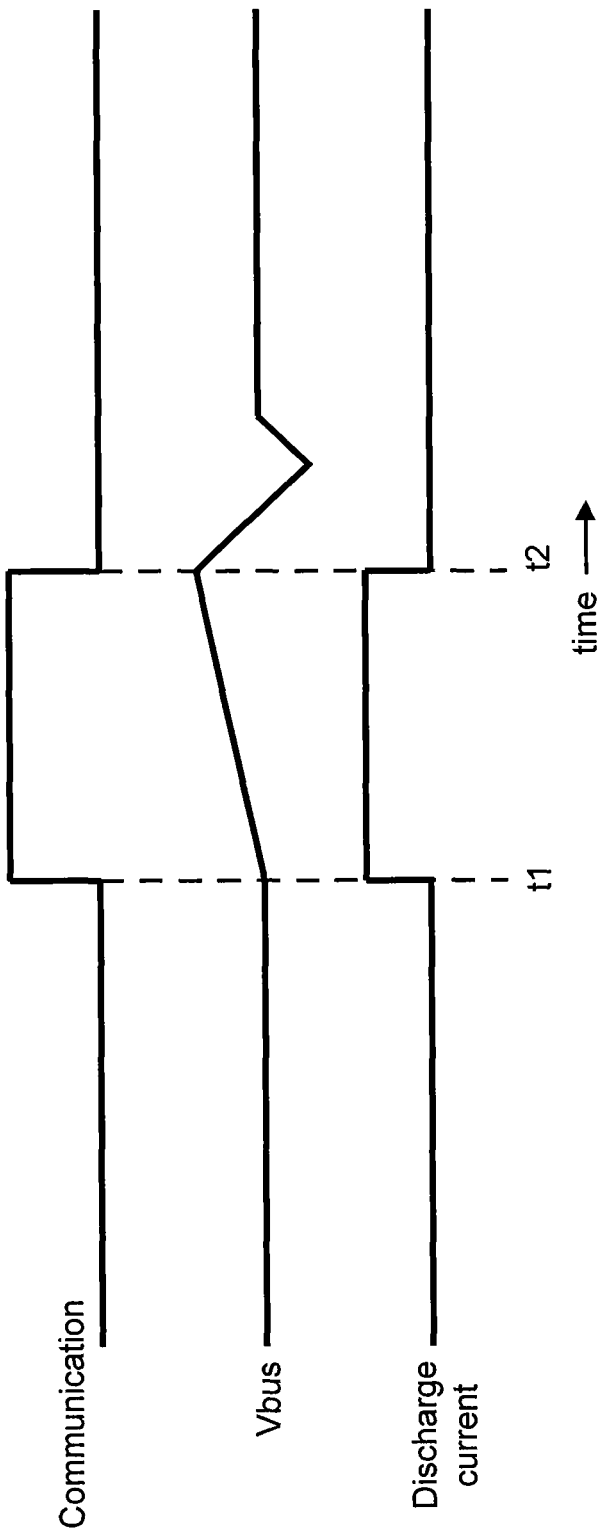
FIG. 2 illustrates the power supply voltage and discharge current waveforms during a conventional communication period.

Should the secondary-side controller U2 sense through the data channels that the mobile device has disconnected from the USB cable 110, there is a possibility that a new mobile device may connect to the USB cable 110 and that this new mobile device does not support an elevated power supply voltage. To lower the power supply voltage to the default level (e.g., to 5V), secondary-side controller U2 switches on a current source I1 coupled between ground and the output voltage rail 115. This current source I1 is also exploited by secondary-side controller U2 to address the power supply voltage increase that occurs during primary-side-to-secondary-side communication. Although the use of the current source I1 to address the power supply voltage increase is conventional, the current conducted by the current source I1 during such conventional use is constant. This may be better appreciated with reference to FIG. 2, which illustrates the power supply voltage Vbus and the current source current (discharge current) waveforms during a primary-side-to-secondary-side communication period. The communication begins at a time t1 and ends at a time t2. During this communication period, the discharge current conducts at a constant level. The power supply voltage Vbus undesirably climbs during the communication period then undergoes a substantial disturbance after time t2 that is also undesirable.

Figure 3:
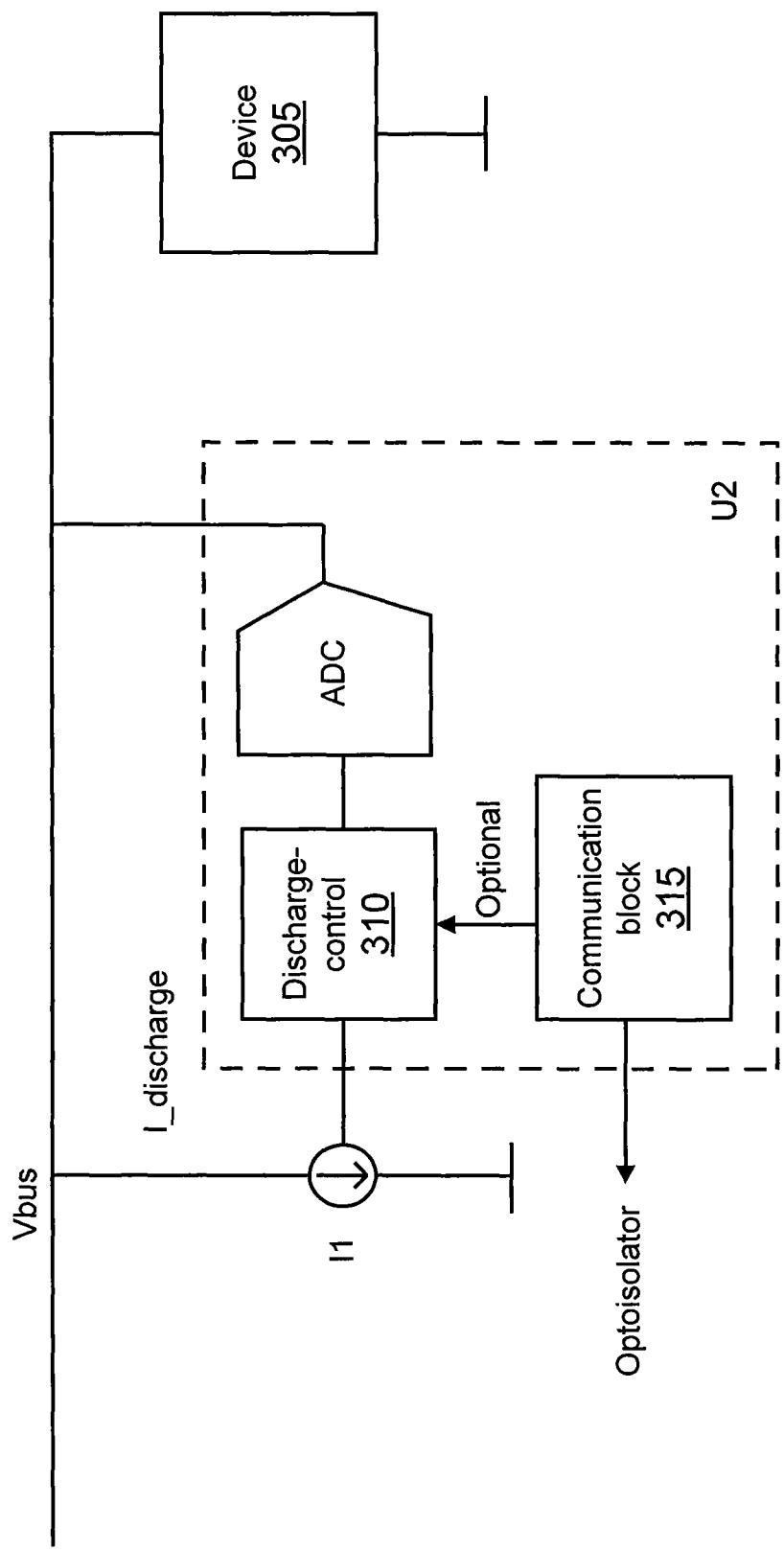
FIG. 3 is a more detailed view of a secondary-side controller that includes an analog-to-digital converter for measuring the deviation of the power supply voltage from a desired value in accordance with an aspect of the disclosure.

Secondary-side controller U2 addresses this undesirable disturbance in the power supply voltage by dynamically controlling the amount of current discharged by current source I1 during the communication period. This dynamic control of the amount of current is responsive to the deviation of the power supply voltage from its desired level and may be implemented with respect to either a digital or an analog sensing of the power supply voltage. For example, the secondary-side controller U2 may include an analog-to-digital converter (ADC) as shown in FIG. 3. The ADC digitizes the power supply voltage Vbus that drives a mobile device 305. For illustration clarity, the USB cable is shown in simplified form in FIG. 3. A discharge control logic circuit 310 in secondary-side controller U2 determines the deviation between the digitized power supply voltage and a digitized desired power supply voltage. This deviation (which can be positive or negative) is itself a digital value. Based upon this digital deviation, discharge control logic circuit 310 changes the discharge current conducted by the current source I1. For example, discharge control logic circuit 310 may generate a 3-bit control signal for controlling current source I1 such that current source I1 can conduct one of eight different levels of the discharge current responsive to control signal. Alternatively, discharge control logic circuit 310 may generate an analog control signal to continuously vary the discharge current.

Secondary-side controller U2 includes a communication module 315 for controlling the transmission of messages to the primary-side controller U1 through the optoisolator. In some embodiments, discharge control logic circuit 310 responds to the initiation of communication by communication module 315 by commanding current source I1 to discharge a default level of current while the communication is active. This default level of current is then adjusted while communication is active in response to the deviation of the power supply voltage from its desired value.

Figure 4:
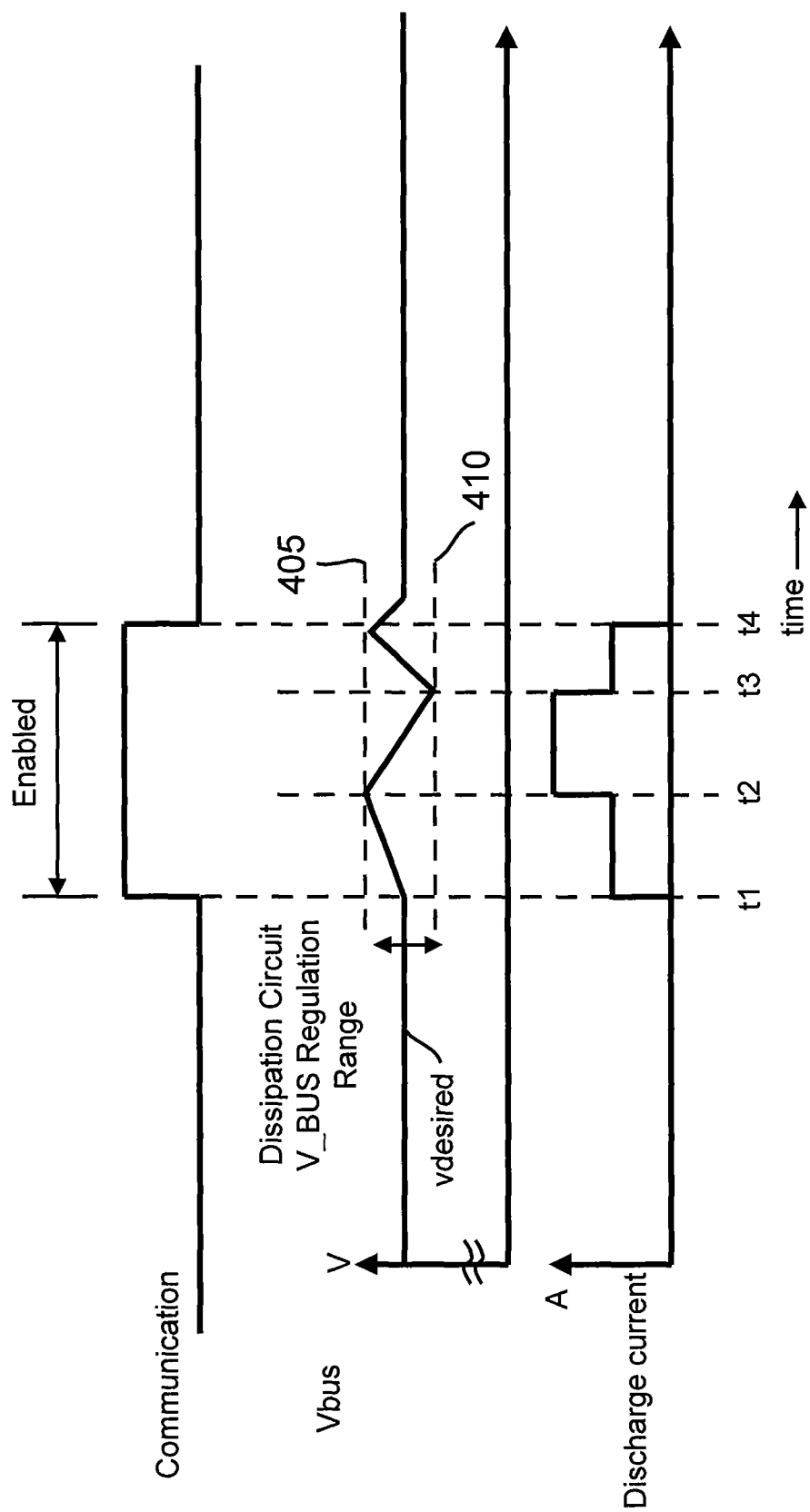
FIG. 4 illustrates the power supply voltage and discharge current waveforms during a communication period for the secondary-side controller of FIG. 3.

The discharge current waveforms in response to a digital control signal along with the corresponding power supply voltage waveform are shown in FIG. 4. The communication period begins at a time t1 and ends at a time t4. In response to the beginning of the communication period, the discharge current begins conducting at its default level that is used whenever communication is active. The power supply voltage Vbus begins to increase from its desired level (Vdesired) from time t1. The discharge current is thus discharged at the default level from time t1 until the power supply voltage rises to an upper limit 405 of a power supply voltage regulation range. In response to the power supply voltage reaching its upper limit at a time t2, the discharge current is increased to a second level, which causes the power supply voltage to decline until it reaches a lower limit 410 of the power supply voltage regulation range at a time t3. The discharge current is then decreased to the default level until the communication period ends at time t4. The resulting disturbance of the power supply voltage is considerably reduced as compared to the static discharge current control of FIG. 3.

Figure 5:
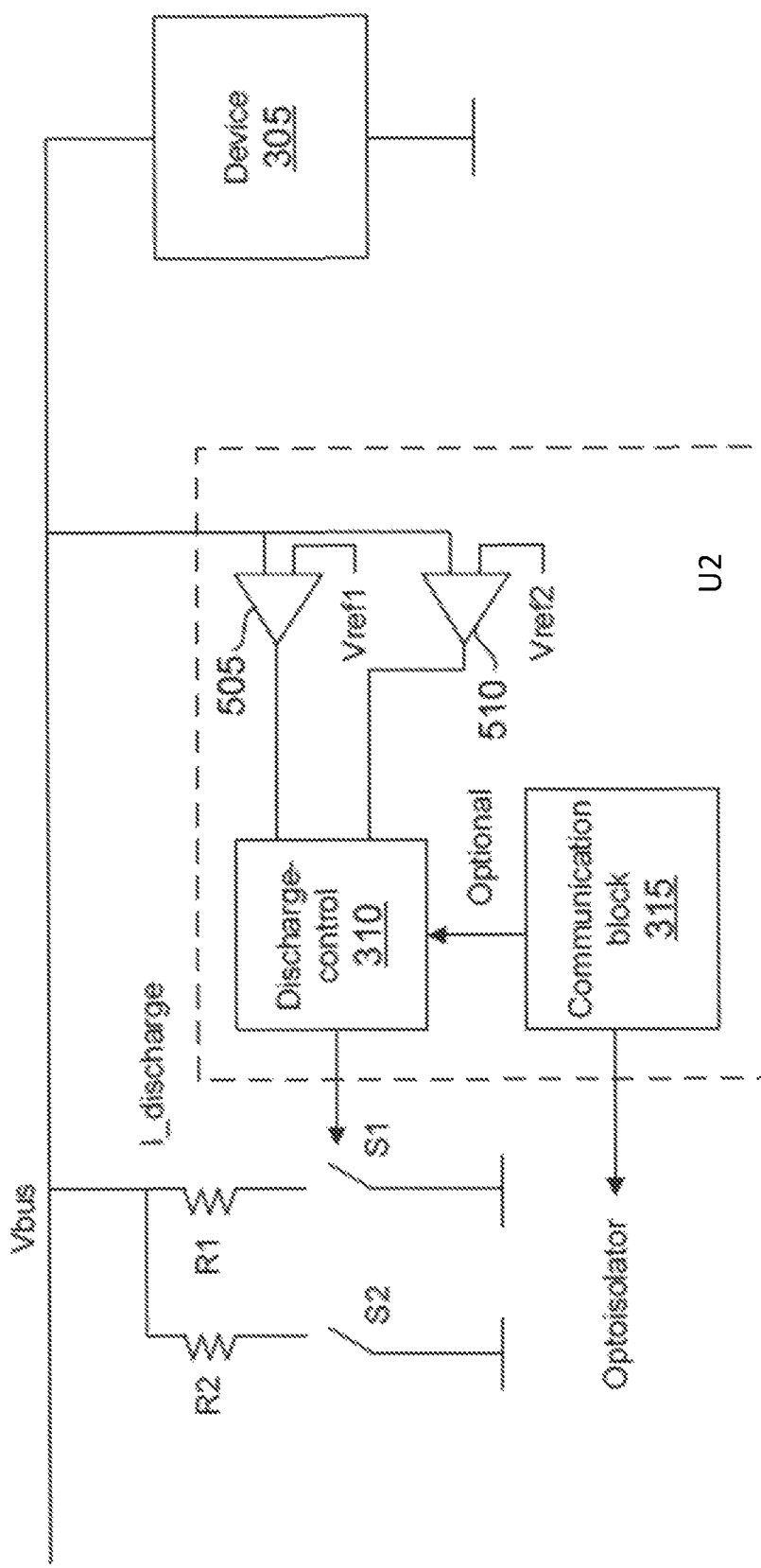
FIG. 5 is a more detailed view of a secondary-side controller that includes a plurality of comparators for measuring the deviation of the power supply voltage from a desired value in accordance with an aspect of the disclosure.

In an alternative embodiment, the power supply voltage is not digitized such as shown in FIG. 5. In this embodiment, the power supply voltage is compared to plurality of threshold voltages by a corresponding plurality of comparators. For example, a first comparator 505 compares the power supply voltage to a first reference voltage (Vref1) such as the upper limit voltage 405 of FIG. 4. A second comparator compares the power supply voltage to a second reference voltage (Vref2) such as the lower limit voltage 410 of FIG. 4. Based upon the outputs of the two comparators, discharge control logic circuit 310 can determine whether the power supply voltage is within the desired regulation range and control the discharge current accordingly. Note that the current source may be replaced by selectable resistors such as resistors R1 and R2. Resistor R1 couples from the output voltage rail through a switch S1 to ground. Similarly, resistor R2 couples from the output voltage rail through a switch S2 to ground. It will be appreciated that additional resistances may be implemented to increase the dynamic range of the discharge current adjustment. By varying the selected resistance through actuation of the corresponding switches, discharge control logic circuit 310 adjusts the discharge current accordingly. Each resistor in series with its corresponding switch may be denoted as a selectable resistor circuit herein.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
a current source configured to conduct a discharge current from an output voltage rail for the flyback converter responsive to a discharge command; and
a secondary-side controller configured to enumerate a mobile device regarding whether the mobile device supports a fast charge mode and configured to transmit a message to a primary-side controller during a communication period confirming that the fast charge mode is supported by the mobile device, the secondary-side controller including:
a discharge control logic circuit configured to adjust the discharge command responsive to a deviation of a power supply voltage from a desired value of the power supply voltage during the communication period.

2. The flyback converter of claim 1, wherein the secondary-side controller further includes:
an analog-to-digital converter configured to digitize the power supply voltage to form a digitized measurement of the power supply voltage, and wherein the discharge control logic circuit is further configured to adjust the discharge command responsive to a deviation of the digitized measurement of the power supply voltage from a digitized version of the desired value of the power supply voltage.

3. The flyback converter of claim 2, wherein the discharge command is a digital discharge command.

4. The flyback converter of claim 2, wherein the discharge control logic circuit is further configured to adjust the digital discharge command from a default level, and wherein the current source is further configured to conduct a default value for the discharge current in response to the digital discharge command equaling the default level.

5. The flyback converter of claim 1, wherein the secondary-side controller further includes:
a first comparator configured to compare the power supply voltage to a first reference voltage; and
a second comparator configured to compare the power supply voltage to a second reference voltage, and wherein the discharge control logic circuit is further configured to adjust the discharge command responsive to a first output signal from the first comparator and to a second output signal from the second comparator.

6. The flyback converter of claim 2, wherein the secondary-side controller is further configured to transmit the message to the primary-side controller through an optoisolator.

7. The flyback converter of claim 1, wherein the message comprises a series of pulses transmitted through an optoisolator to the primary-side controller.

8. The flyback converter of claim 7, wherein the primary-side controller is configured to cycle a power switch transistor for a series of cycles responsive to the series of pulses.

9. The flyback converter of claim 1, wherein the current source is arranged in parallel with a secondary winding of a transformer in the flyback converter.

10. The flyback converter of claim 1, in which the secondary-side controller is further configured to enumerate the mobile device through a USB cable.

11. A method during a communication period for a flyback converter:
transmitting a message as a series of pulses from a secondary-side controller to a primary-side controller;
in the primary-side controller, acknowledging the series of pulses by cycling a power switch through a series of cycles;
measuring a deviation of a power supply voltage from a desired value for the power supply voltage responsive to the cycling of the power switch through the series of cycles; and
adjusting a discharge current to ground from an output voltage rail supplying the power supply voltage to maintain the power supply voltage within a regulation range that includes the desired value for the power supply voltage.

12. The method of claim 11, wherein measuring the deviation of the power supply voltage from the desired value for the power supply voltage comprises:

digitizing the power supply voltage to form a digital power supply value; and subtracting a digitized version of the desired value for the power supply voltage from the digital power supply value.

13. The method of claim 11, further comprising:

discharging a default value of the discharge current to ground from the output voltage rail at a beginning of the communication period, wherein adjusting the discharge current comprises increasing the discharge current from the default value to a first increased value responsive to the deviation of the power supply voltage from the desired value of the power supply voltage exceeding a first threshold value.

14. The method of claim 11, wherein adjusting the discharge current maintains the power supply voltage within a desired regulation range that includes the desired value of the power supply voltage.

15. The method of claim 11, wherein adjusting the discharge current comprises adjusting a current source coupled to the output voltage rail.

16. The method of claim 11, further comprising:

enumerating a mobile device to determine whether the mobile device supports a fast charge mode, wherein transmitting the message comprises transmitting a confirmation that the mobile device supports the fast charge mode.

17. The method of claim 13, further comprising:

decreasing the discharge current from the first increased value to the default value responsive to the deviation of the power supply voltage falling below a second threshold value.

18. A flyback converter, comprising:

a plurality of selectable resistor circuits coupled between an output voltage rail for the flyback converter, each selectable resistor circuit comprising a resistor in series with a switch; and a secondary-side controller configured to enumerate a mobile device regarding whether the mobile device supports a fast charge mode and configured to transmit a message to a primary-side controller during a communication period confirming that the fast charge mode is supported by the mobile device, the secondary side controller including:

a discharge control logic circuit configured to select from the plurality of selectable resistor circuits responsive to a deviation of a power supply voltage from a desired value of the power supply voltage during the communication period to adjust a discharge current conducted from the output voltage rail to ground.

* * * * *